United States Patent [19]

Garmany et al.

[11] Patent Number: 4,944,112
[45] Date of Patent: Jul. 31, 1990

[54] LURE SYSTEM WITH ADAPTABLE INSITU BILL ASSEMBLY

[76] Inventors: Douglas L. Garmany, 816 Evergreen Dr., Houston, Tex. 77023; James B. Hughes, P.O. Box 231372, Houston, Tex. 77223

[21] Appl. No.: 357,177
[22] Filed: May 25, 1989
[51] Int. Cl.$^5$ ............................................. A01K 85/00
[52] U.S. Cl. ................................. 43/42.09; 43/42.22; 43/42.47
[58] Field of Search ................. 43/42.09, 42.22, 42.47, 43/42.23

[56] References Cited

U.S. PATENT DOCUMENTS

| | | | |
|---|---|---|---|
| 1,297,617 | 3/1919 | Welles | 43/42.23 |
| 1,542,404 | 6/1925 | Paulson | 43/42.22 |
| 2,494,384 | 1/1950 | Gadzinski | 43/42.09 |
| 3,608,228 | 9/1971 | Borresen | 43/42.22 |
| 4,183,164 | 1/1980 | Young | 43/42.09 |
| 4,215,507 | 8/1980 | Russell | 43/42.22 |
| 4,697,378 | 10/1987 | Tunstall | 43/42.09 |
| 4,807,387 | 2/1989 | Dougherty | 43/42.09 |

*Primary Examiner*—Kurt Rowan
*Attorney, Agent, or Firm*—Harrison & Egbert

[57] ABSTRACT

A lure system with an adaptable insitu bill assembly is provided. In a preferred embodiment, a bill assembly consists of bill base detachably interconnected with a bill extender. The bill base is fixedly attached to the face of the head portion of the lure. In accordance with the concept of the present invention, the leading edges of the bill base are shaped to correspond to the configuration of the recess region of the bill extender, contained on the upper surface thereof. This recess region is preferably constructed with a longitudinal channel, and pair of substantially hemispherical cavities.

Thus, the recess region of bill extender receives the corresponding leading edges of the bill base. Preferably, the keyway contained on the bill base is slidably inserted into the corresponding channel contained in the recess of the bill extender. In addition to the security imparted by the channel means, the bill extender under the concept of the present invention is further secured to the bill base by the cooperation between preferably a pair of hemispherical cavities and a corresponding pair of nipple-like projections.

In accordance with the concept of the present invention, the instant bill assembly enables a lure to be conveniently adpated insitu to varying fishing and environmental conditions, whereby virtually no interruption to the fishing process occurs.

12 Claims, 6 Drawing Sheets

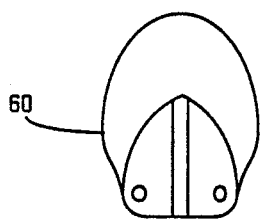
FIG. 7A
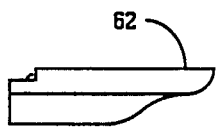
FIG. 7B   FIG. 7C
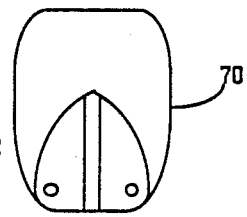
FIG. 8B
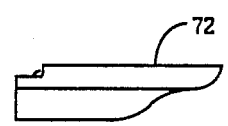
FIG. 8A   FIG. 8C
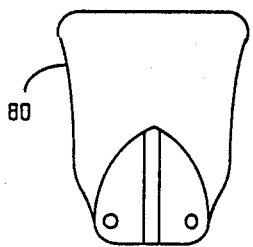
FIG. 9A
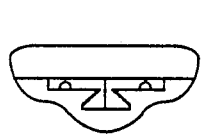   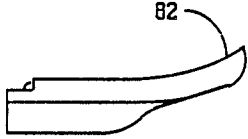
FIG. 9B   FIG. 9C

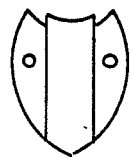
FIG. 10A
 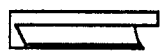
FIG. 10B   FIG. 10C
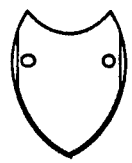
FIG. 11A
 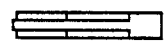
FIG. 11B   FIG. 11C
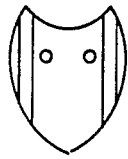
FIG. 12A
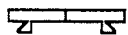 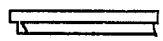
FIG. 12B   FIG. 12C

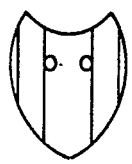
FIG. 13A
 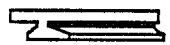
FIG. 13B    FIG. 13C
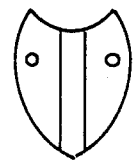
FIG. 14A
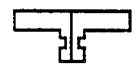 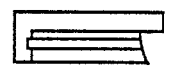
FIG. 14B    FIG. 14C
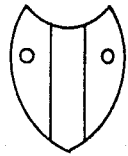
FIG. 15A
 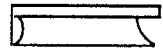
FIG. 15B    FIG. 15C

LURE SYSTEM WITH ADAPTABLE INSITU BILL ASSEMBLY

BACKGROUND OF THE INVENTION

This invention relates to fishing lure systems, and more particularly relates to methods and apparatus for modifying a bill assembly insitu to enable a fishing lure to adapt to various fishing objectives and environmental conditions.

It is well known in the prior art that fishing lures are a useful device for catching fish. Indeed, the typical fisherman has an extensive collection of fishing lures to accommodate different environmental conditions such as water composition, watr flow characteristics, and weather. In addition, the fisherman's lure collection includes lures intended to catch different species of fish.

It is also well known that to be successful catching fish with a lure, the fisherman must select the lure with travel and diving characteristics that accurately mirror the fish being sought. Depending upon the aspirations of the particular fisherman, this collection of lures may be rather substantial to accommodate the diversity of fish under the vicissitudes of mother nature. Accordingly, many attempts in the prior art have sought to limit the prerequisite lures to catching fish under these diverse and unpredictable circumstances.

Many lure systems are known in the art for interchanging the parts thereof whereby a limited inventory of such lures may nonetheless accommodate varying fish idiosyncrasies and unpredictable water and weather conditions. Furthermore, there have been improvements in the prior lure art whereby such adjustable lure have been developed to enable interchanging parts thereof insitu to avoid disruption to the fishing process. These attempts, however, have only been marginally successful in providing a convenient and effective means and method for adapting lures under the exigent conditions that typify the fishing process.

For example, in U.S. Pat. No. 4,215,507, Russell discloses an adjustable fishing lure bill which causes the lure to dive to one of three preselected shallow, medium or deep depths. The particular depth achieved is controlled by a slot gauge which locks the bill into place by rotating an eye screw. While this lure provides for the insitu adjustment of the lure to accommodate varying depths, it apparently requires a tool such as a pair of pliers to accomplish the adjustment thereof. Under customary wet conditions, which could be exacerbated by cold weather, in a small craft and the like, using a tool to make such an adjustment may be cumbersome and even impracticable.

Furthermore, an inherent disadvantage of the Russel lure is that the integrity of the bill assembly turns upon the security imparted by its single eye screw. More particularly, if this eye screw is not properly secured, or if the screw loosens with use, the lure is apt to travel erratically through the water, and the depth achieved is apt to deviate from that intended. As should also be clear to those skilled in the art, the structural limitations of the track of the bill assembly preclude the attachment of bills of different configurations, particularly bill of greater thickness and broader shape to promote deeper diving and travel through the water.

In an attempt to overcome limitations of the prior art, Tunstall in U.S. Pat. No. 4,697,378 discloses a fishing lure which provides a method and apparatus to vary the colors of a lure by interchanging the back thereof without removing the lure from the fishing line. The Tunstall lure also teaches a plurality of depth controls which cause it to plunge to prescribed depths. This insitu depth control is achieved by a snapping means of interconnecting one of a plurality of detachable dive planes with the lure body.

Notwithstanding the Tunstall lure affording a convenient method to forcibly snap interchangeable dive planes into and out of the lure body, its ability to withstand stress from obstructions to normal travel or from large fish is also limited. This tendency for separation caused by obstructions is, of course, more likely to occur at shallow depths than at deep depths. Another disadvantage of this prior art is that the uncertain snugness of fit between the interchangeable parts and the concomitant misalignment thereof, are detrimental to the flow characteristics of the lure.

West, in U.S. Pat. No. 4,619,067, teaches a means for threadingly interconnecting the head portion of a lure with its interchangeable decorative, fish-attracting skirt portion. This lure assembly inherently provides improved security between the head and skirt portions thereof, and also promotes proper alignment therebetween. The method of screwing and unscrewing these interchangeable parts under wet conditions usually in a small craft, requires careful initial alignment of the screw and corresponding threads, which may be difficult and frustrating in a moving craft, and is time-consuming. Furthermore, there is also a tendency for the threads to become obstructed by dirt and the like, and even for the integrity of the threads to deteriorate due to wear.

Accordingly, these limitations and disadvantages of the prior art are overcome with the present invention, and improved means and techniques are provided which are especially useful for adjusting bill attributes insitu to enable a lure to be used to catch a diversity of fish under varying environmental conditions.

SUMMARY OF INVENTION

The present invention provides a lure system with an adaptable insitu bill assembly. In a preferred embodiment, a bill assembly consists of bill base detachably interconnected with a bill extender. The bill base is fixedly attached to the face of the head portion of the lure. In accordance with the concept of the present invention, the leading edges of the bill base are shaped to correspond to the configuration of the recess region of the bill extender, contained on the upper surface thereof. This recess region is preferably constructed with a longitudinal channel, and pair of substantially hemispherical cavities.

Thus, the recess region of bill extender receives the corresponding leading edges of bill base. Preferably, the keyway contained on the bill base is slidably inserted into the corresponding channel contained in the said recess of the bill extender. In addition to the security imparted by the channel means, the bill extender under the concept of the present invention is further secured to the bill base by the cooperation between a pair of hemispherical cavities disposed on the bottom of said bill base and a corresponding pair of nipple-like projections disposed upon the surface of the bill extender recess region.

Accordingly, it is a feature of the present invention that the shape and configuration of the bill base and bill extender provide an improved bill assembly which overcomes the limitations and disadvantages of the prior art.

It is also an object of the present invention to provide an apparatus and method for conveniently changing a fisherman's lure system without interrupting the fishing process.

It is an object and feature of the present invention to provide a bill assembly for effectively and conveniently making insitu adjustments to a fishing lure, whereby its diving and travel characteristics may be varied.

It is an object and feature of the present invention to provide a variable lure system in which the alignment of the lure and it bill assembly is inherently improved.

It is a further object of the present invention to provide a method to interchange the bills of a fishing lure, whereby there is minimal hazard of the bill assembly being separated from the lure body because of a large fish or an obstacle present in the water.

It is still a further object of the present invention to provide a bill assembly which accommodates bill extenders of diverse shapes and configurations which are not limited by the structure of the bill assembly.

It is a specific object of the present invention to provide a lure system, including a head portion and a body portion, adaptable to a plurality of depths and movement characteristics, an insitu adjustable bill assembly detachably interconnected with said head portion, comprising a bill base portion fixedly attached to the face of said head portion having a plurality of spaced-apart eye-like anchor means fixedly attached to the top surface of said bill base portion and disposed perpendicularly thereof, to attach a fishing line to said body portion, a bill extender portion having channel means adapted to be slidably and releasably received by said bill base portion, said channel means comprising a recess region disposed upon the top surface of said bill extender portion configured to received corresponding keyway means disposed longitudinally and symmetrically upon the bottom surface of said bill base portion, and said recess region having slot means disposed longitudinally through and symmetrically of said recess region, to receive said keyway means, and further having a plurality of nipple-like projections disposed upon the top surface thereof, to securably receive a corresponding plurality of cavities disposed upon the bottom surface of said bill base portion.

It is another specific object of the present invention to provide a lure system, including a head portion and a body portion, adaptable to a plurality of depths and movement characteristics, an insitu adjustable bill assembly detachably interconnected with said head portion, comprising a bill base portion fixedly attached to the face of said head portion having a plurality of spaced-apart eye-like anchor means fixedly attached to the top surface of said bill base portion and disposed perpendicularly thereof, to attach a fishing line to said body portion, a bill extender portion having channel means adapted to be slidably and releasably received by said bill base portion, said channel means comprising a recess region disposed upon the top surface of said bill extender portion configured to receive corresponding keyway means disposed longitudinally and symmetrically upon the bottom surface of said bill base portion, and said recess region having slot means disposed longitudinally through and symmetrically of said recess region, to receive said keyway means, and further having a plurality of cavities disposed upon the top surface thereof, to securably receive a corresponding plurality of nipple like projections disposed upon the bottom surface of said bill base portion.

These and other objects and features of the present invention will become apparent from the following detailed description, wherein reference is made to the figures in the accompanying drawings.

IN THE DRAWINGS

FIG. 7 is a top plan view of a bill extender portion of the bill assembly embodying the concept of the present invention.

FIG. 8 is a top plan view of a bill extender portion of the bill assembly embodying the concept of the present invention.

FIG. 9 is a top plan view of a bill extender portion of the bill assembly embodying the concept of the present invention.

FIGS. 10 A, B and C are bottom, front and left side views, respectively, of a bill base portion of the bill assembly embodying the concept of the present invention.

FIGS. 11 A, B and C are bottom, front and left side views, respectively, of a bill base portion of the bill assembly embodying the concept of the present invention.

FIGS. 12 A, B and C are bottom, front and left side views, respectively, of a bill base portion of the bill assembly embodying the concept of the present invention.

FIGS. 13 A, B and C are bottom, front and left side views, respectively, of a bill base portion of the bill assembly embodying the concept of the present invention.

FIGS. 14 A, B and C are bottom, front and left side views, respectively, of a bill base portion of the bill assembly embodying the concept of the present invention.

FIGS. 15 A, B and C are bottom, front and left side views, respectively, of a bill base portion of the bill assembly embodying the concept of the present invention.

DETAILED DESCRIPTION

Figure 1:
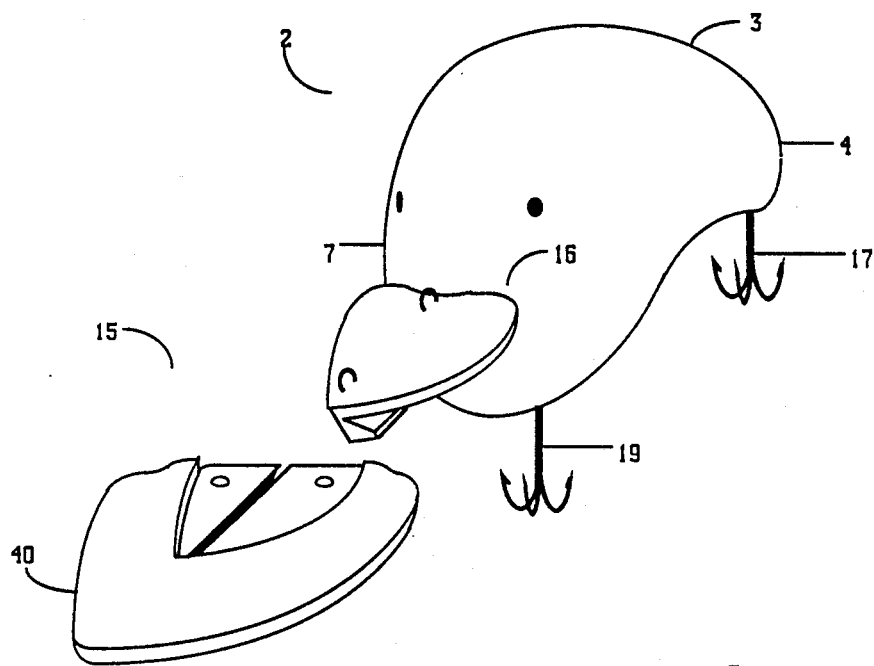
FIG. 1 is a frontal perspective view of a lure apparatus, with its bill assembly detached from its bill base portion, embodying the concept of the present invention.
Figure 2:
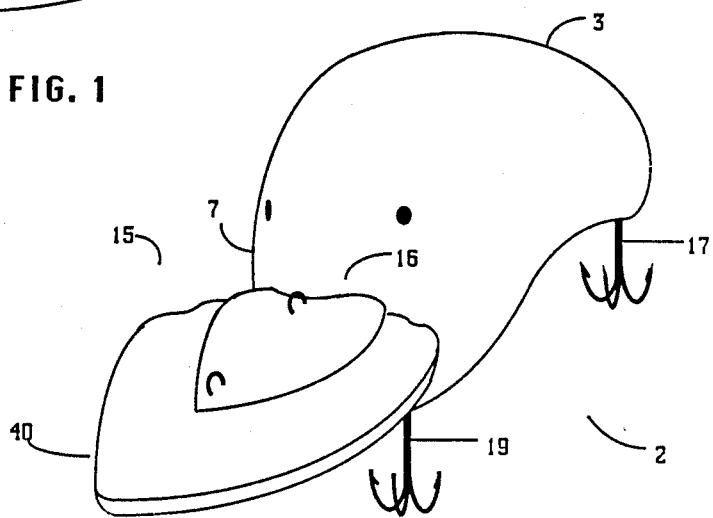
FIG. 2 is a frontal perspective view of a lure apparatus, with its bill assembly attached to its bill base portion, embodying the concept of the present invention.

Referring now to FIGS. 1 and 2, there may be seen frontal perspective view of lure apparatus 2, embodying the concept of the present invention. Lure apparatus 2 consists of body portion 3, head portion 7, bill assembly 15, and fishing hooks 17 and 19. Bill assembly 15 consists of bill base 16 and bill extender 40. FIG. 1 depicts bill base 16 and bill extender 40 in a detached relationship, while FIG. 2 depicts bill base 16 and bill extender 40 interconnected.

Figure 4:
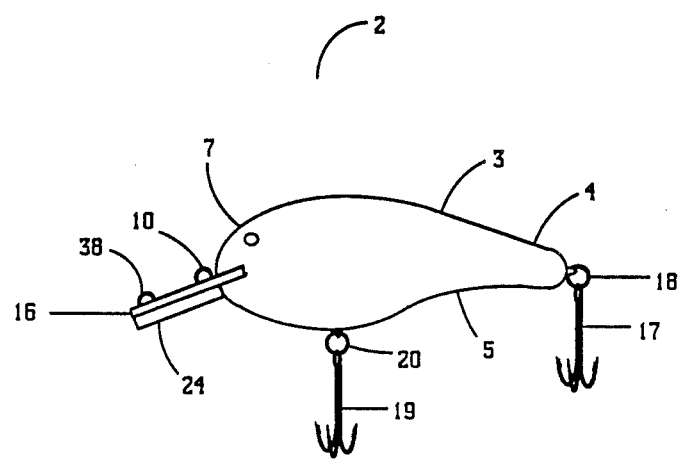
FIG. 4 is a right side view of the lure apparatus depicted in FIGS. 1 and 2.

As more particularly shown in FIG. 4, fishing hook 17 is fixedly attached to the tail 4 of body portion 3 by ring 18. Similarly, fishing hook 19 is fixedly attached to the belly 5 of body portion 3 by ring 20. Bill assembly 15 is detachably interconnected with head portion 7 at bill base 16.

Figure 3:
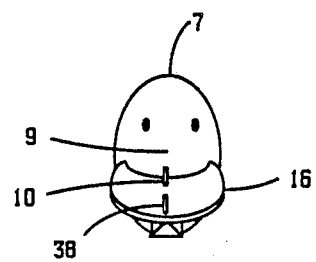
FIG. 3 is a front view of a row of the lure apparatus depicted in FIGS. 1 and 2.

FIG. 3 depicts face 9 of lure apparatus 2 with line guide eye 10 fixedly and perpendicularly attached to bill base 16 along its axis of symmetry, and disposed proximal to said face 7. Line guide eye 38 is also fixedly and perpendicularly attached to bill base 16 along its axis symmetry, and disposed distal to face 7. Now referring to FIG. 4, bill assembly 15 is seen disposed at a conventional angle with respect to face 9, said angle being determined by the intended depth of travel and the flow pattern of lure apparatus 2.

Figure 5:
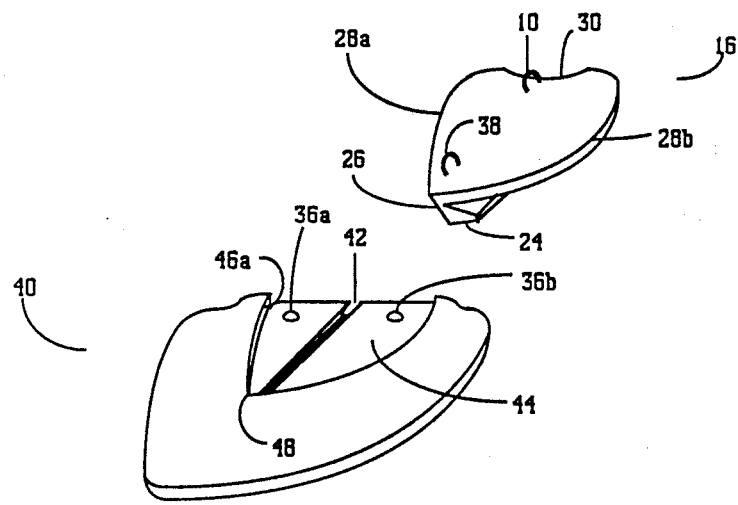
FIG. 5 is an enlarged view of the bill assembly depicted in FIGS. 1 and 2, embodying the concept of the present invention.

Referring now to FIG. 5, there may be seen an enlarged view of bill assembly 15, embodying the concept of the present invention. As hereinabove described, bill base 16 is fixedly attached to the lure's head portion at edge 30. Edges 28 a–b of bill base 16 are shaped to correspond to the configuration of recess 44 of bill extender 40. Recess region 44 is preferably constructed with channel 42, substantially vertical recess walls 46, and pair of substantially hemispherical cavities 50 a–b.

Still referring to FIG. 5, said recess region 44 of bill extender 40 receives the corresponding leading edges 28a and b, and vertex 26 of bill base 16. More particularly, keyway 24 of bill base 16 is slidably inserted into corresponding channel 42, whereby edge 28a of bill base 16 is received by corresponding wall 46a of bill extender 40, and edge 28b of bill base 16 is received by corresponding wall 46b (not shown) of bill extender 40. As is also seen in FIG. 5, vertex 42 of bill base 16 is juxtaposed against corresponding vertex 48 of bill extender 40.

Figure 6:
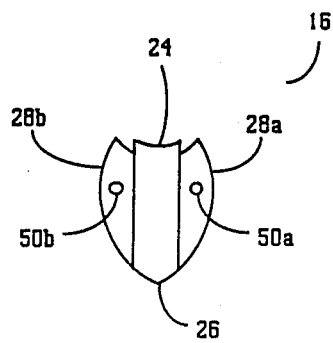
FIG. 6 is a bottom view of the bill base portion of the bill assembly depicted in FIG. 5.

As shown in FIGS. 5 and 6, it is a feature of the present invention that bill extender 40 is further secured to bill base 16 by the cooperation between hemispherical cavities 50 a–b and corresponding pair of nipple-like projections 36 a–b. More particularly, during the reception of bill extender 40 by bill base 16, as hereinabove described in detail, hemispherical cavity 50a, disposed on the bottom of said bill base 16, engages corresponding nipple-like projection 36a, disposed on the surface of recess region 44 of said bill extender 40. Similarly, hemispherical cavity 50b disposed on the bottom of bill extender 40 engages corresponding nipple-like projection 50b disposed upon the top surface of bill base 16.

It should be clear from the foregoing description of this security function, that the cooperation between the pair of nipple-like projections and the pair of cavities may also be accomplished by the nipple-like projections being disposed on the bottom surface of the bill extender and by the cavities being disposed upon the top surface of the bill base. In either arrangement, the bill extender is securely received by the ball base.

This quick and easy method of attaching and detaching bill extender 40 to bill base 16 provides a fisherman with an expedient means to adapt a single lure insitu to a plurality of depths and related movement characteristics. More particularly, the present invention enables a fisherman to conveniently replace the bill extender portion of the bill assembly of the preferred embodiment, with only minimal interruption to the fishing process. It should be apparent that no special tools nor skills are required to accomplish this insitu bill replacement.

As is well known to those skilled in the art, the configuration of the bill assembly determines the preferable depth for using a lure, and also the movement pattern of the lure through the water. The longer and wider the surface area distended by the lure, the greater the drag coefficient thereof. The drag coefficient, in turn, causes the lure to travel at deeper depths in an erratic, less streamlined movement through the water. On the other hand, the shorter and narrower the lure surface area, the lower the drag coefficient thereof.

FIG. 7 depicts a bill extender intended for use at shallow depths of approximately two to three feet. The oval periphery of bill extender 40, and typical length of an inch to one and one-quarter inches thereof, tend to maintain the lure's travel at shallow depths. By contrast, the bill extender depicted in FIG. 8 is intended for use at medium depths of approximately three to five feet. As should be apparent to those familiar with the art, the substantially rectangular periphery thereof imparts more bulk and resistance to the lure's passage through the water, thereby causing the lure to travel at deeper depths than a lure with the configuration depicted in FIG. 7. Similarly, the approximately trapezoidal periphery of the bill extender depicted in FIG. 9 imparts additional bulk to the lure, thereby hindering its flow through the water and causing it to dive to deeper depths than lures having bill assemblies with the configuration shown in FIGS. 7 and 8.

In accordance with the concept of the present invention, a fisherman significantly can reduce his inventory of lures. While it is possible for a fisherman to accomplish his fishing goals with merely one lure embodying the concept of the present invention, he may prefer to have a limited set of such lures with bill bases specifically intended for shallow, medium and deep depths. That is, a fisherman has the option to use a series of lures, with bill bases ranging in length as appropriate. For example, a typical length of the bill base of a lure intended for use at shallow depths, is one-half inch. A length of three-quarters to one inch would be appropriate for medium depths. For intended use at deeper depths, a lure with a bill base ranging from one and one quarter to one and one-half inches would be appropriate.

As is well known in the art, the bill base is fixedly attached to the face of the lure at a conventional angle therewith. Thus, to promote the lure's tendency to dive to greater depths and to exhibit less streamlined flow through the water, the bill base would preferably be attached to the lure at a greater angle than for more streamlined flow near the water's surface.

It is also a feature of the present invention that the said bill assembly may be readily adapted to varying fishing conditions with only minimal interruption. Since no tools are required to interchange the bill extenders that embody the present invention, adapting a lure therewith may be accomplished notwithstanding the conventional undulating motion of a small craft and the like. Furthermore, the bill extender may be quickly exchanged even under cold, wet conditions, in which a fisherman's fingers may be numbeed thereby.

It is another feature of the present invention that the leading edge of the bill base is preferably constructed with an arcuate configuration in order to avoid any undesired movement within the bill assembly during the lure's travel. As should be clear to those skilled in the art, the bill assembly within the instant inventive concept is securely attached to the lure body and tends to resist movements extraneous to the movement of the lure, per se.

As hereinbefore state, it is an object of the present invention to provide an apparatus which provides a lure system which may be expeditiously adapted to be used for the full gamut of depths. It is accordingly an important feature of the present invention that to promote a lure's diving to deeper depths, an optional line guide eye, disposed remotely from the face of the lure, may be used to secure the fishing line to the lure.

Referring to FIGS. 3 and 4, to achieve normal diving and movement characteristics, a fisherman would secure his fishing line to eye 10 of a lure constructed with the adaptable bill assembly as hereinabove described in detail. On the other hand, to achieve maximum diving attributes, a fisherman would preferably affix his fishing line to eye 38, thereby effectuating a pitched movement through the water. It is an important feature of the present invention that fishing line is securably attached to the body of the lure instead of the bill extension. This provides significant advantage over adjustable bill assemblies known to the prior art in which fishing line is attached to the separable bill portion, which, of course, are prone to become dislodged from the body of the lure per se under conditions of stress and the like.

It should be apparent to those skilled in the art that the present invention affords the fisherman control over the movement and diving characteristics of a lure system heretofore obtainable only with either a substantial inventory of lures or with special tools and parts.

It should be clear to those knowledgeable in the art that the present invention is particularly advantageous for fishing under circumstances in which the preferable lure characteristics is not known apriori, perhaps because of uncertain weather forecasts or the nature and location of the fishing adventure.

It should also be apparent to those skilled in the art that the present invention enables a fisherman's lure inventory to be significantly reduced in size and cost, but not in versatility.

FIGS. 10–15 depict well known alternative methods, within the concept of the present invention, of securing the bill extender to the bill base of the bell assembly.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to be measured by the scope of the appended claims herein.

What is claimed is:

1. In a lure system, including a head portion and a body portion, adaptable to a plurality of depths and movement characteristics, an insitu adjustable bill assembly detachably interconnected with said head portion, comprising
   a bill base portion fixedly attached to the face of said head portion,
   a bill extender portion having channel means adapted to be slidably and releasably received by said bill base portion,
   said channel means comprising a recess region disposed upon the top surface of said bill extender portion configured to receive corresponding keyway means disposed longitudinally and symmetrically upon the bottom surface of said bill base portion, and
   said recess region having slot means disposed longitudinally through and symmetrically of said recess region, to receive said keyway means, and further having a plurality of nipple-like projections disposed upon the top surface thereof, to securably receive a corresponding plurality of cavities disposed upon the bottom surface of said bill base portion.

2. The apparatus described in claim 1 wherein said bill base portion has a plurality of spaced-apart eye-like anchor means fixedly attached to the top surface of said bill base portion and disposed perpendicularly thereof, to attach a fishing line to said body portion.

3. The apparatus described in claim 2 wherein said plurality of eye-like anchor means are oriented parallel of the longitudinal axis of said bill base portion.

4. In a lure system, including a head portion and a body portion, adaptable to a plurality of depths and movement characteristics, and insitu adjustable bill assembly detachably interconnected with said head portion, comprising
   a bill base portion fixedly attached to the face of said head portion,
   a bill extender portion having channel means adapted to be slidably and releasably received by said bill base portion,
   said channel means comprising a recess region disposed upon the top surface of said bill extender portion configured to receive corresponding keyway means disposed longitudinally and symmetrically upon the bottom surface of said bill base portion, and
   said recess region having slot means disposed longitudinally through and symmetrically of said recess region, to receive said keyway means, and further having a plurality of cavities disposed upon the top surface thereof, to securably receive a corresponding plurality of nipple-like projections disposed upon the bottom surface of said bill base portion.

5. The apparatus described in claim 4 wherein said bill base portion has a plurality of spaced-apart eye-like anchor means fixedly attached to the top surface of said bill base portion and disposed perpendicularly thereof, to attach a fishing line to said body portion.

6. The apparatus described in claim 5 wherein said plurality of eye-like anchor means are oriented parallel of the longitudinal axis of said bill base portion.

7. In a lure system, including a head portion and a body portion, adaptable to a plurality of depths and movement characteristics, an insitu adjustable bill assembly detachably interconnected with said head portion, comprising
   a bill base portion fixedly attached to the face of said head portion,
   a bill extender portion having channel means adapted to be slidably and releasably received by said bill base portion,
   said channel means comprising a recess region disposed upon the top surface of said bill extender portion configured to receive corresponding keyway means disposed upon the bottom surface of said bill base portion.
   said recess region having disposed upon its upper surface a plurality of nipple-like projections to securably receive a corresponding plurality of cavities disposed upon the bottom surface of said bill base portion, and having slot means disposed longitudinally through and symmetrically of said recess region to receive said keyway means, said keyway means being disposed longitudinally and symmetrically of said bill base portion.

8. The apparatus described in claim 7 wherein the top surface of said recess region has a plurality of cavities to securably receive a corresponding plurality of nipple-like projections disposed upon the bottom surface of said bill base portion.

9. The apparatus described in claim 7 wherein said bill base portion has a plurality of spaced-apart eye-like anchor means fixedly attached to the top surface of said bill base portion and disposed perpendicularly thereof, to attach a fishing line to said body portion.

10. The apparatus described in claim 9 wherein said plurality of eye-like anchor means are oriented parallel of the longitudinal axis of said bill base portion.

11. In a lure system, including a head portion and a body portion, adaptable to a plurality of depths and movement characteristics, an insitu adjustable bill assembly detachably interconnected with said head portion, comprising a bill base portion fixedly attached to the face of said head portion having a plurality of spaced-apart eye-like anchor means fixedly attached to the top surface of said bill base portion and disposed perpendicularly thereof, to attach a fishing line to said body portion, a bill extender portion having channel means adapted to be slidably and releasably received by said bill base portion, said channel means comprising a recess region disposed upon the top surface of said bill extender portion configured to receive corresponding keyway means disposed longitudinally and symmetrically upon the bottom surface of said bill base portion, and said recess region having slot means disposed longitudinally through and symmetrically of said recess region, to receive said keyway means, and further having a plurality of nipple-like projections disposed upon the top surface thereof, to securably receive a corresponding plurality of cavities disposed upon the bottom surface of said bill base portion.

12. In a lure system, including a head portion and a body portion, adaptable to a plurality of depths and movement characteristics, and insitu adjustable bill assembly detachably interconnected with said head portion, comprising a bill base portion fixedly attached to the face of said head portion having a plurality of spaced-apart eye-like anchor means fixedly attached to the top surface of said bill base portion and disposed perpendicularly thereof, to attach a fishing line to said body portion, a bill extender portion having channel means adapted to be slidably and releasably received by said bill base portion, said channel means comprising a recess region disposed upon the top surface of said bill extender portion configured to receive corresponding keyway means disposed longitudinally and symmetrically upon the bottom surface of said bill base portion, and said recess region haivng slot means disposed longitunally through and symmetically of said recess region, to receive said keyway means, and further having a plurality of cavities disposed upon the top surface thereof, to securably receive a corresponding plurality of nipple-lik projections disposed upon the bottom surface of said bill base portion.

* * * * *